United States Patent [19]

Benker et al.

[11] 4,007,112
[45] Feb. 8, 1977

[54] METHOD OF CONTROLLING A DISTILLATION COLUMN FOR TOPPING CRUDE PETROLEUM

[75] Inventors: Guy Benker, Melun; Bernard Louvel, Versailles; Dominique Tauszig, St Foy les Lyon; Bernard Vourron, Oullins, all of France

[73] Assignee: Institut Francais du Petrole, des Carburants et Lubrifiants et Entreprise de Recherches et d'Activites Petrolieres Elf, Paris, France

[22] Filed: May 27, 1975

[21] Appl. No.: 581,346

[30] Foreign Application Priority Data

May 30, 1974 France .............................. 74.18869

[52] U.S. Cl. ................................ 208/350; 196/132; 208/DIG. 1
[51] Int. Cl.² ........................ B01D 3/42; C10G 7/00
[58] Field of Search ............. 208/350, DIG. 1, 354, 208/355, 347; 196/132

[56] References Cited

UNITED STATES PATENTS

| | | |
|---|---|---|
| 3,208,230 | 9/1965 | Fourroux ............................ 196/132 |
| 3,296,121 | 1/1967 | Potts .................................. 208/355 |
| 3,365,386 | 1/1968 | Van Pool ........................... 208/355 |
| 3,463,725 | 8/1969 | Macfarlane ........................ 208/358 |
| 3,911,259 | 10/1975 | Huddleston et al. ......... 235/151.12 |

OTHER PUBLICATIONS

Oglesby et al., "The Oil and Gas Journal," vol. 64, No. 2, Jan. 10, 1966, pp. 80 to 86.

Primary Examiner—Herbert Levine
Attorney, Agent, or Firm—Sughrue, Rothwell, Mion, Zinn & Macpeak

[57] ABSTRACT

The method consists in preparing from the crude petroleum being processed a representative cut constituting a vaporized fraction having a known yield, in plotting the TBP curve of the cut by chromatographic analysis and by integration of the quantitative signal produced as a result of the analysis. The information obtained from the analysis is processed in order to operate a control unit for generating signals which serve to adjust the rates of withdrawal of the cuts at different predetermined levels of the column.

3 Claims, 4 Drawing Figures

$$x = \frac{\Sigma D_{SN} + D_\ell}{D_B}$$

METHOD OF CONTROLLING A DISTILLATION COLUMN FOR TOPPING CRUDE PETROLEUM

This invention relates to a method for controlling the operation of a distillation column for the topping of crude petroleum which carries out in particular the separation of the processed product into its different "cuts" as defined respectively by their initial and final distillation temperatures and corresponding to a succession of by-products which can be placed in classes ranging from the heaviest fraction such as the distillation residue to the lightest fraction such as gasoline, including the intermediate fractions such as gas oil, kerosine, naphtha and so forth.

In accordance with known practice, the distillation of crude petroleum is carried out by means of vertical distillation columns of conventional type comprising a series of superposed horizontal plates. The crude petroleum which has previously been heated to a temperature in the vicinity of 320° to 380° C is fed into the columns at a predetermined flow rate and then abruptly expanded, thus causing vaporization of the major fraction of the crude. The vapors obtained rise within the column whilst the unvaporized liquid fraction falls into the bottom of the column and constitutes the topping residuum which is usually withdrawn and then treated in another installation. The rising vapors are washed by a downflowing liquid reflux which is fed back to the head or top of the column; this cold reflux condenses as the progressively heavier components of the initial vapors are passed downwards within the column. The gasoline then leaves the top of the column, is immediately condensed in a drum and a part of this latter is fed back into the column so as to constitute the cooling liquid reflux whilst the remainder or so-called excess reflux constitutes the total gasoline fraction withdrawn from the unit.

The other products such as naphtha, kerosine or gas oil are withdrawn laterally in liquid form at different levels within the column on the corresponding plates of this latter, said plates being suitably located during the design study of the installation. The levels of product withdrawal having thus been established, the operation of the column can accordingly be regulated only by modifying the rate of product withdrawal at each level. In fact, if the rate of withdrawal is increased in the case of a given product, said product will be heavier or in other words will contain a larger fraction of lower products in the range of cuts of the initial crude oil corresponding especially to higher final distillation temperatures. On the contrary, if the rate of withdrawal decreases, the product withdrawn will contain a higher concentration of light elements. In other words, if the rate of product withdrawal increases, the downward reflux flow rate from the plate corresponding to the level of withdrawal also decreases in a substantially equivalent proportion. The rising vapors beneath said plate are therefore condensed to a lesser degree and in turn produce a more powerful revaporizing action on the lighter fraction of the liquid mixture which is poured from the plate, the liquid portions collected thereon being therefore heavier while the temperature rises at the same time. It can readily be understood that exactly the reverse process takes place if the rate of product withdrawal decreases, the overall result achieved by adjusting said rate of withdrawal being to adjust the final temperature of distillation of the product withdrawn whereas adjustment of the initial point corresponds to the value of the next higher product withdrawal within the column. In all cases, fractionation between two successive cuts withdrawn from the column is improved by steam stripping or with a light gaseous product with a view to removing from each cut the light fraction which belongs to the next higher cut, the vapor and this light fraction being then returned directly to the column.

There is in fact a known method of obtaining the distillation curve or so-called TBP curve (True Boiling Point curve) corresponding to each given sample of crude petroleum. This curve gives the yield, that is, the relative quantity withdrawn from each possible cut as defined by the initial and final distillation temperature, with the result that the treated crude petroleum is perfectly characterized. By making a suitable choice of the rates of product withdrawal as explained in the foregoing, it is thus possible to separate the cuts which are withdrawn and to obtain in the case of each cut the maximum yield corresponding to optimum adjustment of the column. In actual fact, a curve of this type has been obtained up to the present time by means of complex laboratory analyses which call for a high degree of distillation of a sample and require a handling time of the order of 8 to 12 hours at least. A laboratory analysis of this type cannot therefore be employed on an industrial scale and has not usually been adopted in the prior state of the art in order to control a distillation column for topping crude oil.

The present invention is directed to a novel process for controlling a column of this type which is based on rapid plotting and utilization of the TBP curve of crude petroleum treated in said column. This method is primarily intended to permit the possibility of distilling within the column crude oils having variable characteristics or mixtures derived from various sources without entailing the need to recalculate the optimum conditions of operation at each modification of the raw material to be treated, the new adjustment data being continuously provided by a study of the corresponding TBP curve.

To this end, the method under consideration consists:
in preparing from the crude petroleum being processed a representative cut constituting a vaporized fraction having a known yield,
in plotting in respect of the cut which has thus been prepared the TBP distillation curve (true boiling point curve) by means of a chromatographic analysis in which the hold-up time is in linear relation with the distillation temperature in respect of the analyzed fraction and by means of an integration of the quantatative signal supplied by the analysis which gives as a function of the temperature the value of the quantity of product analyzed in the cut which has been prepared.
and in processing the information provided by the chromatographic analysis in order to operate a control unit for generating signals which are utilized for adjusting the rates of withdrawal of the cuts at different predetermined levels of the column.

In order to carry out the chromatographic analysis which is necessary for the practical application of the method according to the invention, a temperature-programming device can advantageously be employed. By means of a device of this type in which the time of analysis is of the order of one hour, it is possible in a very short time to supply the control unit with information which permits immediate modification of the column adjustment data while adjusting the rate of each product withdrawal so that the cuts obtained as determined by their initial and final distillation temperatures ensure a suitable yield in the case of each by-product and a constancy of the characteristics of each by-product.

As a further preferable feature, one mode of preparation of the analyzed cut consists in withdrawing a vaporized fraction of the crude petroleum in the expansion zone of the distillation column, this withdrawal being performed by means of the device described and illustrated in patent application Ser. No. 581,347. This makes it possible in particular to carry out the separation of the vapor fraction and the liquid residue. Under the temperature conditions considered within the column, namely of the order of 320° C to 380° C, the liquid residue is non-vaporizable and cannot be processed by the chromatographic analyzer.

In accordance with another characteristic feature, the method in accordance with the invention consists in calculating the quantitative value of the analyzed cut with respect to the total composition of a sample of the treated crude petroleum in order to permit suitable graduation of yields on the TBP curve obtained, then in extrapolating said curve which is plotted solely in respect of the analyzed fraction and in the liquid residue zone in order to obtain the TBP curve which is representative of the entire sample.

The overall result thereby achieved is that, by acquiring rapid knowledge of the TBP curve, it is possible to determine the optimum yields of each cut in respect of any given crude oil and to adjust the corresponding rates of product withdrawal.

The method according to the invention also makes it possible to modify the control of the column in order to adjust the characteristic specifications of the cuts taken, that is to say the nature of certain characteristics of the by-products withdrawn. To this end, the method consists in utilizing on the basis of the distillation temperatures given by the TBP curve a factor for the adjustment of rates of product withdrawal by producing action on the final point of distillation of the top cuts or on the initial point of the bottom cuts. By way of example, it will thus be possible to utilize the measurements of the cut specifications such as the flash point, the temperature of filtrability, the color, the viscosity for effecting a final adjustment of these specifications. In particular, it will be possible to make use of the arrangements described in patent application Ser. No. 581,347 in order to adjust the specification corresponding to the index of filtrability of the gas oil.

Further properties of the method of control in accordance with the invention will also be brought out by the following description of one exemplified embodiment which is given by way of indication and not in any sense by way of limitation, reference being made to the accompanying drawings, in which.

Figure 1:
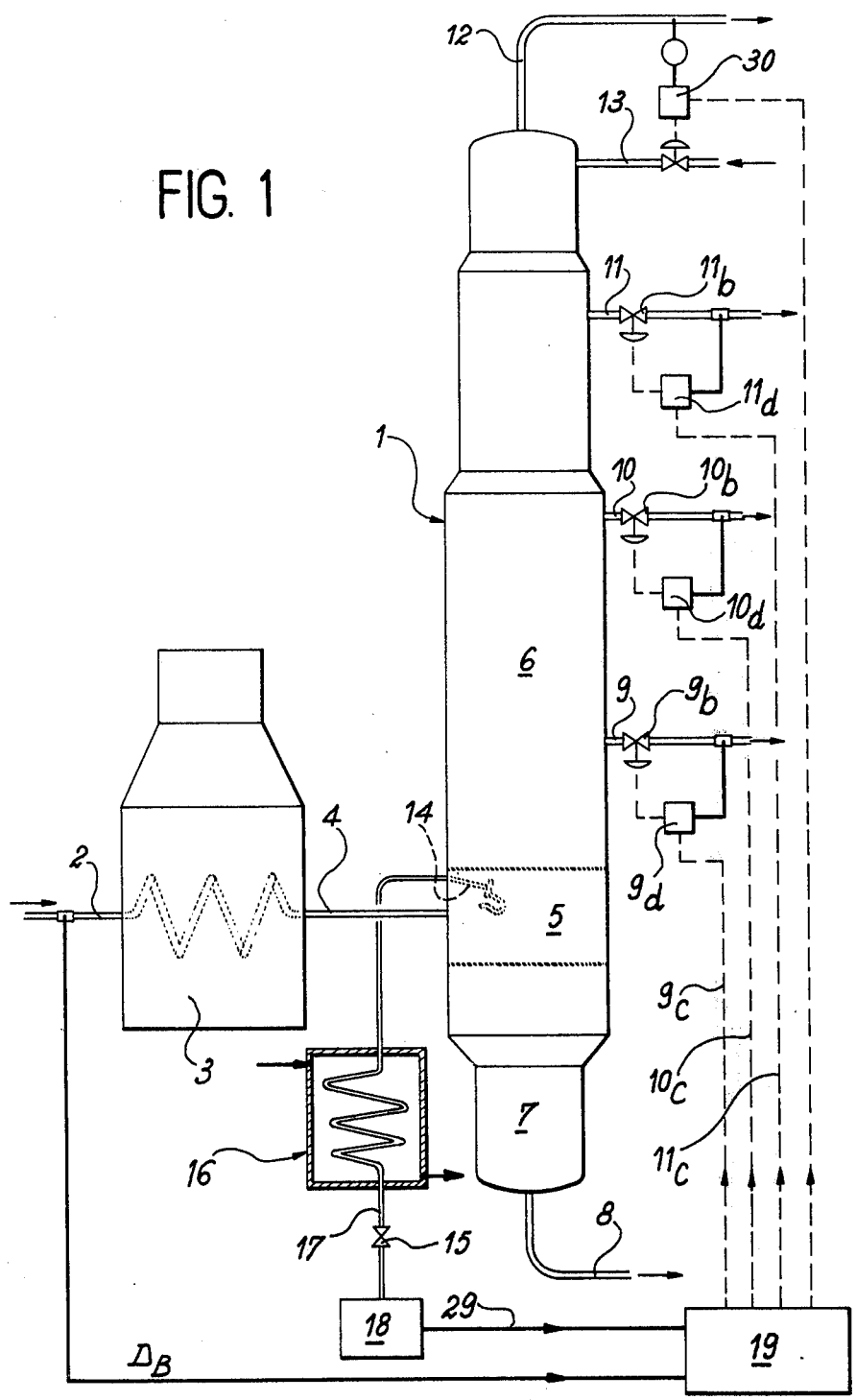
FIG. 1 is a schematic view in elevation showing a distillation column which utilizes the method under consideration.

In FIG. 1, the reference numeral 1 designates diagrammatically a distillation column of known type having a vertical axis. Said column is intended to process a crude petroleum and especially to carry out the distillation of this latter under atmospheric pressure while permitting withdrawal from said column of the different by-products or "cuts" which can be obtained from said petroleum such as, in particular, gasoline, naphtha, kerosine, the gas oils and so forth. On the upstream side of the column, the petroleum to be treated is directed through admission pipe 2 into a furnace 3 in which its temperature is increased to a value of approximately 320° to 380° C. The petroleum which passes out of the furnace through the pipe 4 is then injected into the zone of the column 1 which is designated by the reference numeral 5. In this zone, there takes place an abrupt expansion of the petroleum accompanied by vaporization of a large fraction of this latter. Thus, the vapors obtained rise within the column into the region 6 is located above the expansion zone 5 whilst the remaining fraction or so-called atmospheric residue in the form of liquid falls into the bottom 7 of the column from which it is removed by means of a pipe 8. The column 1 is provided especially in the region 6 located above the expansion zone 5 with a series of horizontal distillation plates (which are not shown in the drawings). Progressively lighter fractions of the rising vapors derived from the expansion zone 5 and from the lateral withdrawal pipes designated respectively by the references 9, 10 and 11 are condensed successively at the level of said horizontal plates. The different cuts obtained from the distillation of the petroleum being processed can thus be extracted from said column at the level of a certain number of the plates mentioned above. Each draw-off pipe 9, 10 or 11 is also provided with a regulating valve 9b, 10b or 11b for adjusting the flow rate of the product withdrawn.

There is placed at the top of the column 1 an eduction pipe 12 for removing the lightest vapors which reach the top of the column and especially gasoline vapors. There is also placed at the top of the column a pipe 13 for reinjecting part of said vapors after these latter have been condensed in the form of liquid gasoline so as to constitute a liquid reflux stream for washing the rising vapors countercurrentwise as these latter pass upwards within the column.

In the expansion zone 5 in which the crude petroleum to be distilled is admitted, the column 1 is provided in accordance with a characteristic arrangement of the invention with a continuous sampling device constituted by a tube 14. The constructional detail of said device can conform in particular to the device described and claimed in the aforementioned patent Application Ser. No. 581,347. Said sampling tube is provided externally of the column with a regulating valve 15, a condenser 16 and a pipe 17 for feeding the withdrawn fraction to a chromatographic analyzer 18. In accordance with arrangements which will also be explained in detail hereinafter, the withdrawn fraction is analyzed in said chromatographic analyzer so as to provide information relating directly to the relative quantity of product which distils at a given temperature. The temperature-programming chromatographic analyzer 18 then delivers electrical recording signals to the lead 29. Said signals are directed to a processing and control unit 19 which in turn provides control information for operating the regulators 9d, 10d, 11d by means of the leads 9c, 10c, 11c respectively, thus regulating the rate of product withdrawal at the different levels within the column 1.

The sampling tube 14 makes it possible in particular to carry out the continuous removal from the expansion zone of a vapor sample which can be directly processed by the chromatographic analyzer 18, said vaporized fraction being therefore representative of the crude petroleum injected less the fraction corresponding to the liquid residue withdrawn from the bottom 7 of the column. An auxiliary device which will be described in detail hereinafter makes it possible in addition to determine the mass ratio of the vaporized fraction which has been sampled and therefore analyzed within the chromatographic analyzer with respect to a corresponding sample of injected petroleum and to deduce therefrom the elements which make it possible to graduate the scale of yields on the distillation curve or TBP curve shown in FIG. 3. Flashing or expansion of the product within the zone 5 of the column in fact achieves a high degree of separation between the liquid residue and the other by-products or cuts of the treated petroleum which are vaporized in said zone and ascend within the column. By virtue of its special shape and the different components associated therewith, the sampling tube thus makes it possible to withdraw only the vapor phase and to deduce the plot of the TBP curve relating to the entire quantity of treated crude petroleum from the information supplied by the analyzer 18 in which this phase alone is taken into consideration.

In regard to the analyzer 18, this latter is designed to deliver an output signal whose amplitude is continuously proportional at the instant $t$ after injection to the quantity of hydrocarbons which leave the chromatographic column of the apparatus. The linear relation between said instant $t$ and the boiling or distillation temperature of the analyzed product is in fact known and therefore makes it possible by means of suitable temperature programming of the chromatographic column to determine the value of the hold-up time and consequently the related value of the distillation temperature in the case of each cut of the sample which is examined. Moreover, the integral of the signal delivered by the analyzer makes it possible to represent directly the quantity of analyzed sample to the instant $t$ and thus to relate the distillation temperature to the yield of each cut. This integration can be performed in particular by any analog or digital device (not shown) which is directly associated with the analyzer. There are thus provided all the necessary elements for plotting the TBP curve which gives the temperature as a function of the percentage processed within the analyzer in the case of the sample which has been withdrawn.

The general conditions of operation having thus been explained, the practical operation of the column 1 in accordance with the method of the invention takes place as follows. In order to carry out atmospheric distillation or topping, the crude petroleum which is injected into the fractionating column at high temperature is largely vaporized in the expansion zone 5 of said column. The vapors which pass upwards within the portion 6 containing the plates are then washed by the colder liquid reflux which condenses the heavier portions of said vapor at the level of the different plates. The gasoline which leaves the head of the column through the pipe 12 is also condensed in a reflux drum (not shown), a stream being then fed back through the return pipe 13 at a sufficient flow rate and passed countercurrentwise within the column.

The other products such as naptha, kerosine and the gas oils are withdrawn laterally in liquid form at the level of different plates which are suitably located at the time of the design study and construction of the column, said withdrawal being effected through the different pipes 9, 10 and 11. Since the zones of withdrawal are thus fixed, adjustment of the products can be obtained only by varying their rate of withdrawal.

It has in fact already been explained that, as the rate of product withdrawal is higher, so the product withdrawn is heavier. This means that the final distillation temperature of said product is higher and that the increase in the rate of product withdrawal produces a substantially equivalent decrease in the flow rate of cold reflux which passes downwards from the plate considered. The flow rates of rising vapors therefore increase beneath said plate and said vapors revaporize the light fraction of the liquid whilst the fractions which condense thereon are consequently heavier. The liquid becomes heavier at the level of product withdrawal and the temperature rises on the plate. Conversely, the product withdrawn becomes lighter as a result of a decrease in the rate of withdrawal. It is therefore possible to adjust the final distillation point of a product, the initial point being set by the value of the immediately higher withdrawal from the column. It should be noted that, in the particular case of gasoline obtained at the top of the column, this adjustment is preferably obtained directly, simply by regulating the controlled temperature at 30 and modifying the reflux flow rate. In the case of the other product withdrawals, the fractionation between two successive cuts can advantageously be perfected by stripping the steam or with another light product. The intended function of this stripping process is to remove from a given cut the light fraction which normally belongs to the next higher withdrawal. Finally, the residue is separated directly in liquid form within the bottom of the column into which the stripping vapor can also be injected.

Reverting now to the signals delivered by the chromatographic analyzer on the vaporized fraction withdrawn from the expansion zone, it has been seen that said signals made it possible to plot the distillation curve or TBP curve in respect of said fraction which corresponds only to a part of the initial crude petroleum, especially as a result of the removal of the liquid residue collected at the bottom of the column. In order to determine the elements which make it possible to plot the entire curve, it is accordingly necessary to know the exact fraction of the vaporized crude petroleum which corresponds to the sample withdrawn; this information can be obtained by means of a material balance within the column itself.

If it is in fact considered within the expansion zone 5 that the flow rate of ascending vapors is equal to:

$$D_V = \Sigma D_{SN} + D_1$$

where $D_{SN}$ represents the flow rate of each lateral product withdrawal and $D_1$ represents the flow rate of liquid reflux within the expansion zone, the simulated TBP curve obtained by the analyzer therefore corresponds to a fraction of the crude petroleum such that:

$$X = \frac{\Sigma D_{SN} + D_1}{D_B} \quad \text{or alternatively}$$

$$X = \frac{D_B - D_R + D_1}{D_B}$$

where $D_B$ is the total flow rate of the crude petroleum and $D_R$ is the flow rate of the liquid residue.

Figure 2:
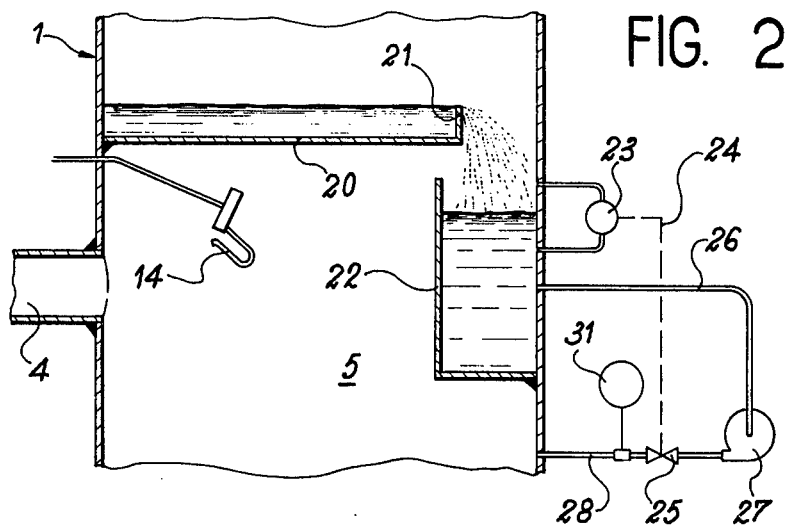
FIG. 2 is a view to a larger scale showing the zone of expansion of the crude petroleum treated within the column shown in FIG. 1 in which are carried out the admission of said petroleum and the continuous withdrawal of a vaporized fraction of this latter.

The flows of the crude petroleum and of the lateral product withdrawals can be measured in a conventional manner. So far as concerns the flow of liquid reflux $D_1$ in the expansion zone or so-called "overflash," this flow is measured by means of the known device shown in FIG. 2.

The figure illustrates to a larger scale the expansion zone 5 of the column 1, the top portion of which is delimited by the first horizontal distillation plate 20, one edge of which is constituted by a baffle-plate 21 over which the condensed liquid fraction is poured. It is thus apparent that this liquid fraction is collected inside the column 1 within a lateral container 22 which is secured against the internal surface of the column. Measurement of the level of liquid within said container 22 is carried out by means of a transducer 23 or like measuring instrument, the information of which produces action on a regulating valve 25 by means of a lead 24. Said valve is mounted on a discharge pipe 26 fitted with a pump 27 and a return pipe 28 through which the withdrawn stream is fed back beneath the container 22 so as to ensure that the level of the liquid is always maintained at a constant value within the interior of said container. The stream which is reinjected into the column therefore corresponds exactly to the stream which is continuously poured from the plate 21. By subtraction, it is thus possible to deduce the value of the flow $D_1$ measured by the instrument 31 from the flow measured at the bottom of the column. Measurement of the liquid reflux flow rate $D_1$ in the expansion zone can be carried out by other devices, especially by means of a weir system from the container 22 controlled by the transducer 23. Steps can also be taken to correlate this flow with measurements performed on the column itself, especially with the temperature difference between the expansion zone and a distillation plate located between this latter and the first withdrawal plate encountered above said zone.

Figure 3:
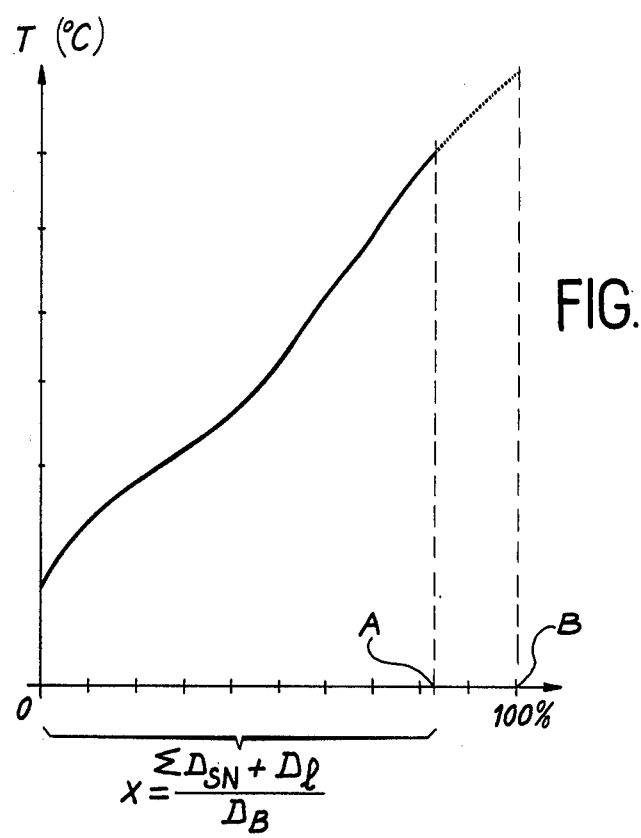
FIG. 3 represents the distillation curve or TBP curve of the sample under examination, in a system of coordinates in which the distillation temperatures are plotted as ordinates and in which the yield expressed as a percentage of the withdrawn fraction is plotted as abscissae.

All the elements which are necessary for the calculation having thus been supplied, the chromatographic analyzer 18 makes it possible by means of the signals delivered to plot the curve illustrated in FIG. 3. In this figure, the distillation temperatures are plotted as ordinates and the values corresponding to the integration of the signals given and representative of the yield in respect of the analyzed fraction are plotted as abscissae. In this figure, the graduation of the axis of abscissae corresponds to the fraction X noted earlier in the case of the portion located between the origin O and the point A. If there is then taken into account the graduation comprised between the points A and B where the point B is representative of 100% of a sample of processed crude petroleum, it will be an easy matter to extrapolate the curve and to obtain as an overall result the values of the distillation temperatures for all the cuts. All these data and plotting of the curve itself can be obtained in a relatively short time which is less than one hour and in any case substantially shorter than the times which were necessary in the prior art in the case of laboratory analyses.

Control of the distillation column 1 then consists in suitable processing of the information thus produced, the parameters supplied being utilized on the one hand in order to adjust the temperatures of the gasoline at the head of the column and on the other hand in order to adjust the withdrawal flow rates of the different cuts through the lateral pipes 9, 10 and 11, with the result that given temperatures determined by the column operator can be obtained in respect of said cuts.

So far as adjustment of the gasoline is concerned, the cut temperature essentially depends not only on the column head temperature but also on the operating conditions, especially on the partial pressure of the gasoline and on the quality of fractionation achieved at the head as given by the ratio of the liquid to the vapor at this level. In this case the relation is as follows:

$$Tco = K1 + \frac{Tce + K2}{1 + (Tce + K3) K4 \log P} + K \left( \frac{L}{V} - K_6 \right)$$

where Tco is the cut temperature to be attained, Tce is the effective temperature at the column head, P is the partial pressure of the gasoline, L and V are the liquid and vapor flow rates at the top plate of the column. Adjustment accordingly consists in calculating the head temperature variation which should be produced in order to obtain the desired cut temperature while taking into account the variations in pressure and the quality of the fractionation. The coefficients $K_1$, $K_2$ and $K_3$, etc. depend on the column and are determined in this letter by means of a preliminary experimental study.

Figure 4:
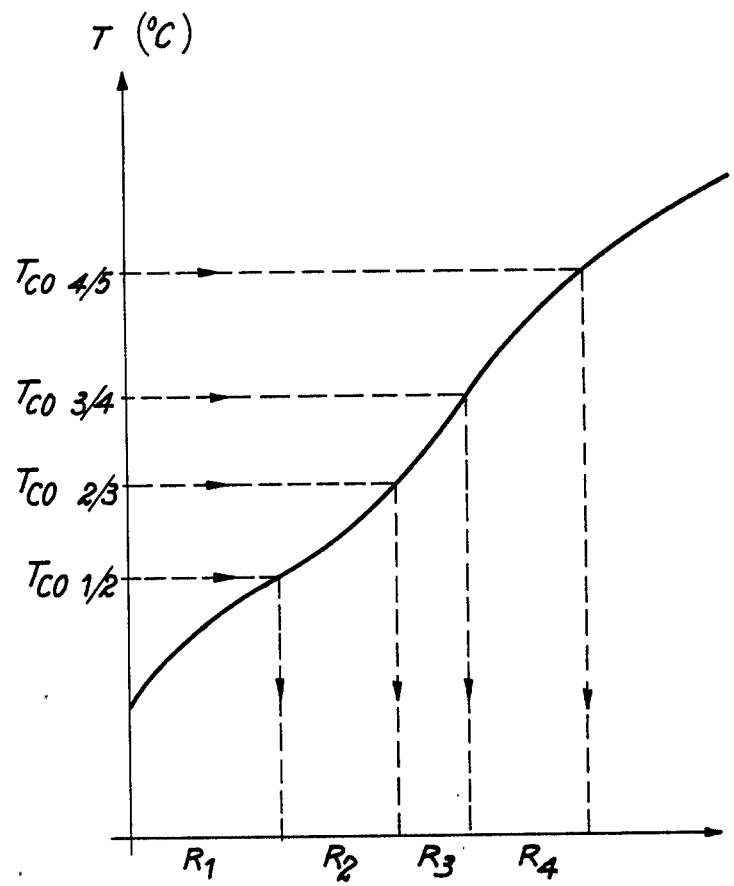
FIG. 4 illustrates the method adopted for determining the optimum yields from the desired temperatures of cuts in one example of TBP curve obtained in accordance with the method.

On the other hand, in regard to adjustment of the lateral product withdrawals, the distillation curve obtained is utilized directly with a view to determining the yields to be imposed, that is to say the flows to be withdrawn from each of the products in order to obtain these temperatures with high accuracy as indicated in FIG. 4. In fact, using as a basis the yields which have thus been established and the flow of crude petroleum $D_B$, the flow rates to be adjusted in each of these withdrawals by the valves 9b, 10b and 11b in particular can be readily calculated. Finally, in regard to the residue, the flow rate is a direct consequence of the above-mentioned adjustments. This flow rate assumes a value which is such as to equilibrate the material balance of the column under all conditions.

The method according to the invention thus makes it possible to control the operation of a distillation column according to the nature and the particular characteristics of cuts to be obtained, especially as a function of the cut temperatures. However, these cut temperatures are not the only specifications of the products withdrawn from a topping column; in fact, the properties of said cuts are usually closely related to their intended function and may consequently make it necessary to adjust other characteristics such as, in particular, the flash point of a kerosine, the temperature of filtrability of a gas oil, the color of a heavy gas oil, the viscosity of a residue and so forth. These properties do not only involve cut temperatures in such cases but also the actual composition of said cuts. The cut temperatures nevertheless remain the only parameters which have an influence on the adjustment and operation of the column; in consequence, these temperatures should also be used to adjust the settings corresponding to these various specifications. By way of indication, it will thus be possible to adjust the flash point of one of the cuts such as kerosine, for example, by modifying the final temperature of the next higher product withdrawn. In order to adjust the point of filtrability of a gas oil, the final point or in other words the final temperature of said gas oil can also be modified. The adjustment thus performed can be checked by means of laboratory analyses. This clearly makes it necessary to carry out sampling operations and a study of samples and the results obtained again make it possible to perfect the adjustment of the column within the limits imposed. It is also possible in accordance with the preferred mode of operation to adopt the arrangements described in patent application Ser. No. 581,347 cited earlier by making provision for an analyzer in line with the product withdrawal pipe so as to carry out the measurement and correction of this specification both continuously and automatically.

The table which is given hereinafter by way of indication lists the recorded values of yields as a function of temperatures in the case of three particular types of crude petroleum, from which it is possible to plot the corresponding TBP curve in accordance with the method contemplated by the invention.

As is apparent from the foregoing, the invention is therefore not limited to the example of execution which has been more especially described with reference to the drawings but extends on the contrary to all alternative forms.

What we claim is:

1. A method of controlling a distillation column having expansion and distillation zones for topping crude petroleum comprising introducing the crude petroleum into the expansion zone of the column to obtain a vaporized fraction having a known yield,
   withdrawing a representative sample of the vaporized fraction from said expansion zone of said column, subjecting said sample to chromatographic analysis to obtain an output signal for determining the TBP distillation curve in which the hold-up time is in linear relation with the distillation temperature of each product in the analyzed fraction,
   integrating the output signals supplied by the analysis to provide as a function of the temperature the value of the quantity of product analyzed,
   and
   using the information provided by said analysis for operating a control unit for generating signals for adjusting the rates of withdrawal of products at different predetermined levels of the distillation zone.

2. A method as set forth in claim 1 further comprising calculating the quantitative value of the analyzed sample with respect to the total composition of a sample of the crude petroleum to permit suitable graduation of yields on the TBP curve obtained and extrapolating said curve which is plotted solely with respect to the analyzed fraction and in the liquid residue zone in order to obtain the TBP curve which is representative of the entire sample.

3. A method as set forth in claim 1 further comprising utilizing on the basis of the distillation temperatures given by the TBP curve a factor for adjusting the rates of product withdrawal by producing action on the final point of distillation of the top cuts or on the initial point of the bottom cuts.

* * * * *

| | | Examples of TBP obtained | | | | |
|---|---|---|---|---|---|---|
| Approximate composition of treated crude | Emeraude<br>Sirtica<br>Zuetina<br>Es Sider | 35%<br>30%<br>30%<br>5% | Nigeria ·<br>Zarzaitine | 90%<br>10% | Safanya<br>Aramco<br>Basrah | 45%<br>45%<br>10% |
| TBP obtained | temperature ° C | yield % | temperature ° C | yield % | temperature ° C | yield % |
| | 100 | 5.9 | 100 | 6.9 | 100 | 7.1 |
| | 120 | 9.5 | 120 | 9.1 | 120 | 10.5 |
| | 140 | 12.8 | 140 | 11.4 | 140 | 13.4 |
| | 160 | 16 | 160 | 14 | 160 | 16.5 |
| | 180 | 19.4 | 180 | 17 | 180 | 20.1 |
| | 200 | 22.3 | 200 | 19.8 | 200 | 23.4 |
| | 220 | 25.4 | 220 | 22.4 | 220 | 26.5 |
| | 240 | 28.8 | 240 | 25 | 240 | 29.5 |
| | 260 | 32.2 | 260 | 27.8 | 260 | 32.4 |
| | 280 | 35.9 | 280 | 30.8 | 280 | 35.7 |
| | 300 | 39.2 | 300 | 33.6 | 300 | 38.8 |
| | 320 | 43 | 320 | 36.3 | 320 | 41.3 |
| | 340 | 45.7 | 340 | 38.5 | 340 | 43.8 |
| | 360 | 48.6 | 360 | 41 | 360 | 46 |
| | 380 | 50.8 | 380 | 43 | 380 | 47.9 |
| | 400 | 53.9 | 400 | 45 | 400 | 49.3 |

UNITED STATES PATENT AND TRADEMARK OFFICE
CERTIFICATE OF CORRECTION

PATENT NO. : 4,007,112
DATED : February 8, 1977
INVENTOR(S) : Guy BENKER et al

It is certified that error appears in the above-identified patent and that said Letters Patent are hereby corrected as shown below:

IN THE HEADING:

Under "Assignee", delete

"Institut Francais du Petrole, des
Carburants et Lubrifiants et
Entreprise de Recherches et
d'Activites Petrolieres Elf", and insert --Entreprise de Recherches et
d'Activites Petrolieres ELF--.

Signed and Sealed this

Nineteenth Day of April 1977

[SEAL]

*Attest:*

RUTH C. MASON
*Attesting Officer*

C. MARSHALL DANN
*Commissioner of Patents and Trademarks*